March 19, 1940.   T. BERNER   2,193,958
ADVERTISING DEVICE
Filed May 5, 1939   2 Sheets-Sheet 1

INVENTOR.
THEODORE BERNER
BY Charles H. Brown
ATTORNEY.

March 19, 1940. T. BERNER 2,193,958
ADVERTISING DEVICE
Filed May 5, 1938 2 Sheets-Sheet 2
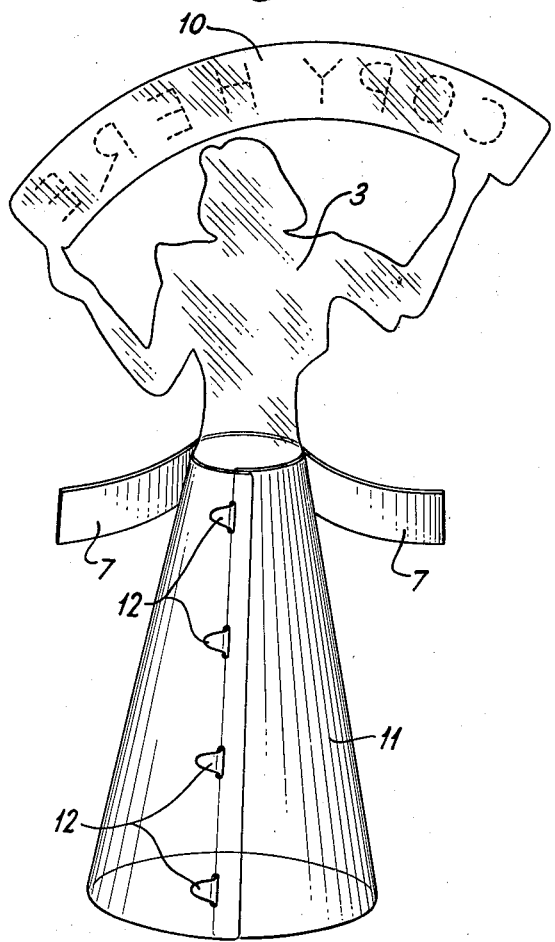
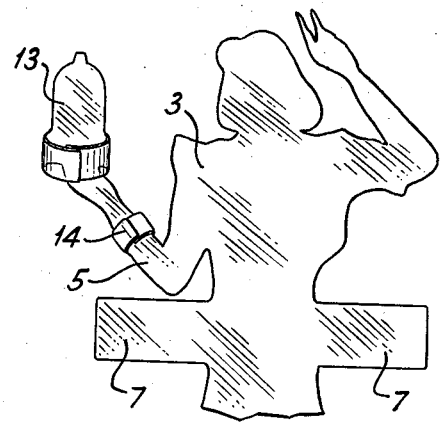
INVENTOR.
THEODORE BERNER
BY Charles H. Brown
ATTORNEY.

Patented Mar. 19, 1940

2,193,958

UNITED STATES PATENT OFFICE 2,193,958

ADVERTISING DEVICE

Theodore Berner, Brooklyn, N. Y.

Application May 5, 1938, Serial No. 206,182

9 Claims. (Cl. 35—55)

The present invention relates generally to an advertising or display device wherein a pliable body of the cut-out type may be attached to a supporting object, such as a display card or favor, to represent a person in full or partial dress, and more particularly to a device simulating a female model displaying goods of various kinds.

An object of the invention is to provide an advertising device of this character which simulates a female model in intimate contact with the subject to be advertised.

Another object is to provide such a device for advertising goods, which is possessed of both pliability and stiffness to enable it to be folded and rolled, and which can be knocked down in flat condition for convenience in shipment.

According to one embodiment of the invention, the display device comprises a decorated blank of transparent material, such as Cellophane, suitably formed to give the appearance of a woman, and folded around the goods to be displayed.

Other objects and features of the invention will appear in the following description, which is accompanied by drawings, wherein:

Fig. 5 and Fig. 6 illustrate other forms which the advertising device of the invention may take; and Fig. 7 shows the device of the invention applied to a favor or token.

In the drawings, the same parts are represented by the same reference numerals throughout the figures.

Figure 1:
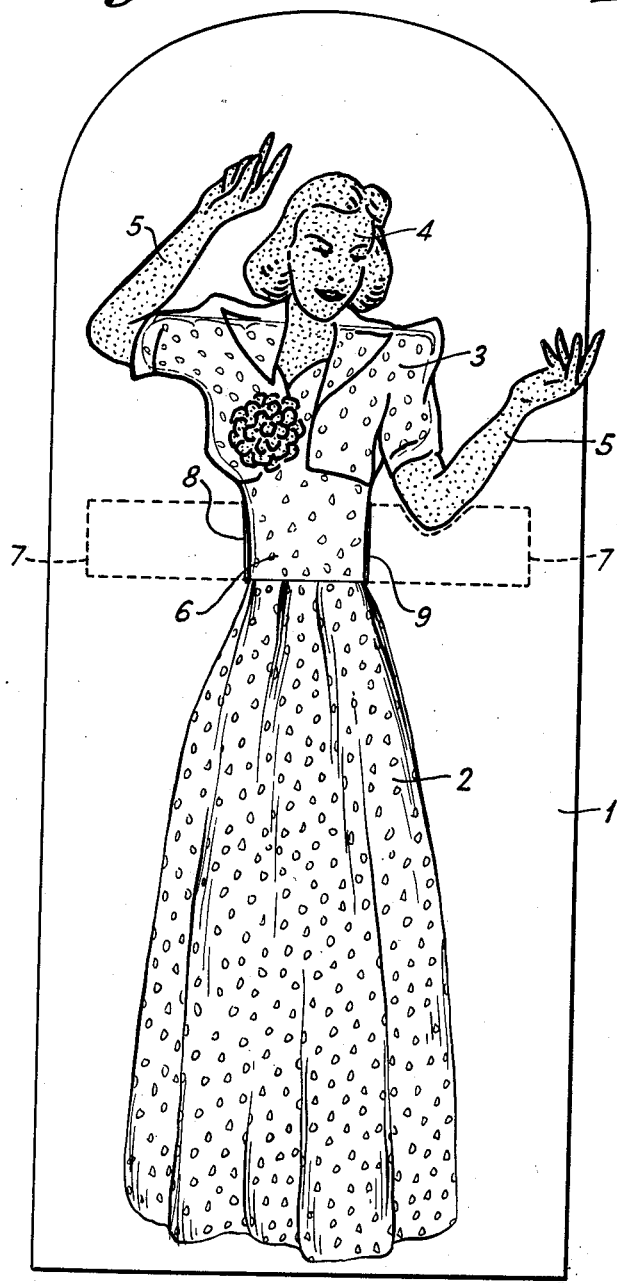
Fig. 1 illustrates a front view of a preferred form of the advertising device of the invention attached to a display card.

Referring to Fig. 1 in more detail, there is shown attached to a suitable card 1, a swatch of material 2 to be advertised, and an advertising device 3 comprising a decorated transparent sheet of material folded around the upper portion of the swatch. Sheet 3 forms the bust of a female model comprising head 4, extended arms 5, 5, shoulders and waist 6. The swatch 2 forms the dress of the model below the transparent sheet and is also visible through the sheet 3 to represent a fully clothed person. Sheet 3 is decorated by paint to indicate the features and jacket of the model, and is opaque at the painted portions. The swatch of material is supported on the card by passing through a longitudinal slot 9. The advertising device 3, on the other hand, is mounted upon the card 1 by means of a pair of tabs 7, 7 which are attached to the waist portion of device 3 and adapted to be inserted into slots 8 of the card. The dotted lines of Fig. 1 represent the tabs in the rear of the card. It should be noted that slots 8 on the card are lower than slot 9, and symmetrically located with respect to the center of slot 9.

Figure 4:
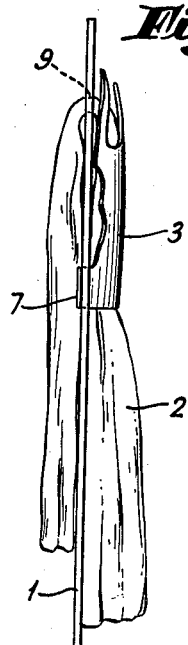
Fig. 4 is a side view of the display of Fig. 1.

Fig. 4 is a side view of Fig. 1 and shows clearly the relative positions of the slots, and how the advertising device 3 is folded around the swatch of material 2.

Figure 2:
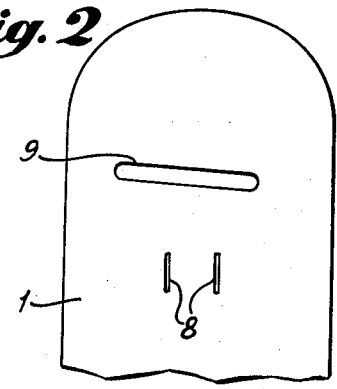
Fig. 2 is a detail view of the upper portion of the display card of Fig. 1, without the advertising device, showing the slots for accommodating the advertising device and the goods to be displayed.

The details of the slots 8 and 9 are also shown in Fig. 2 which constitutes the upper portion of card 1 with the swatch 2 and advertising device 3 of Fig. 1 removed. Card 1 will of course have printed thereon suitable writing matter descriptive of the goods to be advertised.

Figure 3:
Fig. 3 is a detail view of the blank forming the advertising device of Fig. 1, before it is folded.

Fig. 3 shows the advertising device 3 as a blank in outspread condition before it is placed on the card. This figure illustrates the initial form of the advertising device, after it is stamped out from a large sheet in the process of manufacture. This flat form makes it very convenient to pack large quantities of these devices for storage or shipment. It is preferred that device 3 be composed of transparent shell-like material, such as Cellophane, possessed of both pliability and stiffness in a sufficient degree to be folded and rolled, although it should be understood that other materials, transparent or otherwise, can also be used.

Fig. 5 is a modification of the improved advertising device of Fig. 1 and shows how the arms of device 3 can be used to support a strip of material 10 having suitable printing thereon. The waist portion is here extended, as shown, to provide a full length skirt 11. This skirt, as well as the strip 10, preferably forms an integral part of the device 3 so that the entire device can be stamped out in one piece in the manufacture of the initial blank. A strip of material pasted onto the waist forms the tabs 7, 7, for attachment to a card or other supporting object. Fig. 5 illustrates the rear of the advertising device in order to clearly show that the skirt is provided with a plurality of securing means 12, 12, which may consist of tabs or buttons, for maintaining the skirt in rolled or folded position. When the skirt is unrolled, the device 3 will represent the flat condition of the blank as it is packed for shipment.

Fig. 6 illustrates another modification of the advertising device, so arranged that one of the extended arms 5 can support an article 13 to be advertized, such as a lip-stick or a small bottle of perfume. When the advertising device is used in the manner indicated in Fig. 6, it is preferred that the supporting arm 5 be strengthened by making it round and hollow. If this is done, it may be advisable to provide a strengthening strip 14 for this particular hollow arm.

In Fig. 7 the device 3 is folded around a supporting token or favor 15, shown in dotted lines. The tabs 7, 7 fold around the favor 15 and are attached to each other in any desired manner.

It should be understood that the devices of Figs. 5, 6 and 7 have not been shown painted or decorated, merely for the sake of simplicity of the drawings, and that if desired any suitable design can be placed upon the female models of these figures. It should also be understood that the advertising devices of the invention are not limited to simulating female models, although these are preferred, but that if desired a male model or an animal model may also be simulated in similar manner.

What is claimed is:

1. A display device comprising a support having a slot therein, a piece of cloth extending through said slot, and transparent material folded around said cloth and mounted on said support, said material having opaque portions decorated to illustrate certain features of a person and other portions transparent to show the cloth underneath it.

2. A display device comprising a card, a piece of cloth mounted on said card, and a transparent sheet of material folded around a portion of said cloth and secured to said card, said material having certain portions decorated to illustrate the head and arms of a person, and other portions transparent to show the cloth underneath it, whereby it together with said cloth represents a view of said person.

3. A display device comprising a card-like support, a piece of cloth mounted on said support, and a piece of transparent material folded around the cloth, said material having opaque portions decorated to illustrate the head, arms and hands of a female person, and other portions transparent to show the cloth underneath it, said transparent material having a flared out portion above the waist to represent the chest and shoulder portions of a dress made from said cloth showing through said material.

4. A display device comprising a slotted card, a piece of cloth extending through said slot, a piece of transparent material folded around said cloth, said material having opaque portions decorated to illustrate the head and arms of a person and other portions transparent to show the cloth underneath it, said transparent material having tabs for supporting the same on said card.

5. A display device comprising a card, a swatch of cloth mounted on said card, and a pliable sheet of material folded around said cloth and secured to said card, said pliable sheet having opaque portions decorated to illustrate certain features of a person and other portions transparent to show the cloth underneath it, whereby said pliable sheet together with said cloth represents a person wearing a garment made from said cloth.

6. A display device comprising a card, a swatch of cloth mounted on said card, and a pliable sheet of material folded around said cloth and secured to said card, said pliable sheet having opaque portions decorated to illustrate certain features of a person and other portions transparent to show the cloth underneath it, whereby said pliable sheet, together with said cloth, represents a person wearing a garment made from said cloth, said pliable sheet of material having means for attaching it to said card.

7. A display device comprising a support, a pliable material having opaque portions shaped to represent and decorated to illustrate head, arms, hands and bust of a person, said pliable material having means secured thereto for attachment to said support, and means attached to at least one hand of said pliable material for supporting the goods to be displayed.

8. A display device comprising the goods to be displayed, a pliable material folded around said goods and having opaque portions decorated to illustrate the head and arms of a person and other portions representing the shoulders and the waist which are transparent to show the goods underneath it, said pliable material having means secured to the portion representing the waist for attachment to a support.

9. A display device comprising a support, a pliable material having opaque portions shaped to represent and decorated to illustrate head, arms, hands and bust of a person, said pliable material having means secured thereto for attachment to said support, said pliable material having transparent portions to show the support underneath it.

THEODORE BERNER.